(12) United States Patent
Kasatani

(10) Patent No.: US 7,769,249 B2
(45) Date of Patent: Aug. 3, 2010

(54) DOCUMENT OCR IMPLEMENTING DEVICE AND DOCUMENT OCR IMPLEMENTING METHOD

(75) Inventor: Kiyoshi Kasatani, Kanagawa (JP)

(73) Assignee: Ricoh Company, Limited, Tokyo (JP)

( * ) Notice: Subject to any disclaimer, the term of this patent is extended or adjusted under 35 U.S.C. 154(b) by 1013 days.

(21) Appl. No.: 11/509,747

(22) Filed: Aug. 25, 2006

(65) Prior Publication Data

US 2007/0047847 A1 Mar. 1, 2007

(30) Foreign Application Priority Data

Aug. 31, 2005 (JP) ............... 2005-251296

(51) Int. Cl.
*G06K 7/10* (2006.01)

(52) U.S. Cl. .................. 382/321; 382/312; 382/322; 382/323; 382/318

(58) Field of Classification Search ............... 382/321, 382/312, 322, 323, 318
See application file for complete search history.

(56) References Cited

U.S. PATENT DOCUMENTS

| | | | |
|---|---|---|---|
| 2002/0102966 A1* | 8/2002 | Lev et al. ............... | 455/412 |
| 2005/0012953 A1 | 1/2005 | Fujishige | |
| 2005/0024674 A1 | 2/2005 | Fujishige | |
| 2005/0035193 A1* | 2/2005 | Gustin et al. ............ | 235/379 |
| 2005/0062990 A1 | 3/2005 | Fujishige | |
| 2005/0062991 A1 | 3/2005 | Fujishige | |
| 2005/0066274 A1 | 3/2005 | Fujishige | |
| 2005/0091325 A1 | 4/2005 | Kuwana | |
| 2005/0097020 A1 | 5/2005 | Nomura | |
| 2005/0188226 A1 | 8/2005 | Kasatani | |
| 2005/0195446 A1 | 9/2005 | Kasatani | |
| 2005/0210031 A1 | 9/2005 | Kasatani | |
| 2005/0219640 A1 | 10/2005 | Kasatani | |

FOREIGN PATENT DOCUMENTS

| | | |
|---|---|---|
| JP | 2004-356822 | 12/2004 |
| JP | 2005-025390 | 1/2005 |
| JP | 2005-025541 | 1/2005 |
| JP | 2005-025544 | 1/2005 |
| JP | 2005-027067 | 1/2005 |
| JP | 2005-031959 | 2/2005 |
| JP | 2005-031961 | 2/2005 |
| JP | 2005-049972 | 2/2005 |
| JP | 2005-049985 | 2/2005 |
| JP | 2005-051377 | 2/2005 |
| JP | 2005-085069 | 3/2005 |
| JP | 2005-085144 | 3/2005 |

* cited by examiner

*Primary Examiner*—Matthew C Bella
*Assistant Examiner*—Mike Rahmjoo
(74) *Attorney, Agent, or Firm*—Harness, Dickey & Pierce, PLC

(57) ABSTRACT

A document OCR implementing device, includes a reading part configured to read a document and form a recognition image; an obtaining part configured to perform image processing of the recognition image and obtain a state of the recognition image; a plurality of OCR engines configured to perform a character recognition process of the recognition image; and a designating part configured to designate the OCR engine by combining the recognition image and the OCR engine; wherein the character recognition process is implemented by using the OCR engine designated by the designating part.

12 Claims, 13 Drawing Sheets

FIG.7

MANAGER SETTING INFORMATION

<MANAGEMENT SETTING TABLE>
(1) EXTERNAL DEVICE IDENTIFICATION: YES
(2) PRIORITY IDENTIFICATION SETTING: FIRST = FIRST EXTERNAL DEVICE, SECOND = INDIVIDUAL MENU DEVICE
(3) FIRST EXTERNAL DEVICE IDENTIFICATION: YES
(4) FIRST EXTERNAL DEVICE IDENTIFICATION SETTING: TYPE = WINDOWS (REGISTERED TRADEMARK) SERVER, DOMAIN NAME = YES, IP ADDRESS = YES
(5) SECOND EXTERNAL DEVICE IDENTIFICATION: YES
(6) SECOND EXTERNAL DEVICE IDENTIFICATION SETTING: TYPE = MULTI FUNCTION PROCESSING MACHINE, DOMAIN NAME = NO, IP ADDRESS = NO
(7) AUTOMATIC REGISTRATION IN INDIVIDUAL MENU
(8) INDIVIDUAL MENU PASSWORD IS AUTOMATICALLY RENEWED
(9) LOG-IN BY ONLY INDIVIDUAL MENU IDENTIFICATION WHEN EXTERNAL SERVER CONNECTION HAS FAILED: YES
(10) INDIVIDUAL MENU AUTOMATIC DELETION SETTING: AUTOMATIC DELETION=YES, STORING TIME = 7 DAYS, WARNING INDICATION = YES
(11) INITIAL VALUE USER OF INDIVIDUAL REGISTRATION SETTING INFORMATION

FIG.8

INDIVIDUAL SETTING INFORMATION

<INDIVIDUAL SETTING TABLE>
(1) KANA WRITING: RICOH TARO
(2) NAME: RICOH TARO
(3) BELONGING TO: DEVELOPING BUSINESS PART
(4) INDIVIDUAL MENU IDENTIFICATION INFORMATION
(5) FIRST EXTERAL DEVICE IDENTIFICATION INFORMATION
(6) SECOND EXTERAL DEVICE IDENTIFICATION INFORMATION
(7) INDIVIDUAL MENU AUTOMATIC DELETION: PERMIT
(8) INDIVIDUAL MENU AUTOMATIC DELETION SETTING STORING AREA:
    AUTOMATIC DELETION = YES, STORING DAYS: 3 DAYS
(9) FUNCTION LIMITATION INFORMATION
(10) REGISTRATION ADDRESS INFORMATION: NAME = HOME DIRECTLY, NETWORK PASS = YES
(11) COMMON MEDIA INFORMATION: NAME = HOME DIRECTLY, REGISTRATION ADDRESS = HOME DIRECTLY
(12) NEWEST USING STATE STORING AREA

FIG.12

HYSTERESIS/STATUS DISPLAY

SENDING OPTION

SET SENDING OPTION AND PRESS "OK"
*THIS IS A SETTING COMMON FOR E-MAIL SENDING AND FAX SENDING.
 OCR IMPLEMENTING IS AN OBJECT OF A FILE WITHOUT A TEXT.

CANCEL     OK

| | NO CHANGE | IMAGE FILE | IMAGE PDF |
|---|---|---|---|
| ■ FILE FORMAT | | | |
| ■ IMAGE PDF | | | |
| OCR IMPLEMENTING (IMAGE PDF + FOR OCR) | YES | NO | CHANGE |
| PASSWORD/SETTING AUTHORITY | YES | NO | CHANGE |
| EFFECTIVE TERM SETTING | YES | NO | CHANGE |
| EFFECTIVE URL SETTING | YES | NO | CHANGE |

■ FAX RECEIVING 4 CASES    CHANGE

DOCUMENT OCR IMPLEMENTING DEVICE AND DOCUMENT OCR IMPLEMENTING METHOD

BACKGROUND OF THE INVENTION

1. Field of the Invention

The present invention relates to document OCR implementing devices and document OCR implementing methods, and more particularly, to a document OCR implementing device whereby a document is processed by individual OCR engines corresponding to recognition images, and a document OCR implementing method.

2. Description of the Related Art

Recently and continuingly, a network communication system having a document input and output device with a document OCR implementing device, the document input and output device being connected to a network and using plural communication protocols, the document input and output device communicating documents in various data forms to and from plural information devices, has been developed.

In such a network communication system, various application services wherein a document input and output device is used as a core are provided. For example, a document image read out or data made by an information device is sent to a designated address by e-mail, sent by a facsimile, or file-transferred to another information device. Information written in a received e-mail or an image in a file attached to the e-mail is recorded and output, sent to a designated facsimile, or file-transferred to the information device. Storing management of the data sent to the device is performed. See Japanese Laid-Open Patent Application Publication No. 2004-356822, for example.

In a case where an image input from the outside is digitized and stored in a storing device for common use in the network and the image is a subject of search, character recognition (OCR) processing of the document by the OCR implementing device is performed. Here, the image input from the outside is, for example, an image formed by reading a manuscript with an image reading device, an image received by facsimile, an image downloaded while reading a Web page, or the like. See Japanese Laid-Open Patent Application Publication No. 2004-356822.

In the document OCR implementing device having the above-mentioned structure, if a large amount of the documents are character recognition processed, the precision of recognition is improved. However, a large amount of time is required for the processing. In addition, it is not possible to obtain results of the character recognition processing corresponding to an object desirable for the user.

SUMMARY OF THE INVENTION

Accordingly, embodiments of the present invention may provide a novel and useful document OCR implementing device and document OCR implementing method.

More specifically, the embodiments of the present invention may provide a document OCR implementing device or a document OCR implementing method wherein plural OCR engines are installed, and proper OCR engines are combined and selected corresponding to an image state of an object of recognition so that a recognition process proper for use desirable for the user can be implemented.

One aspect of the present invention may be to provide a document OCR implementing device, including: a reading part configured to read a document and form a recognition image; an obtaining part configured to perform image processing of the recognition image and obtain a state of the recognition image; a plurality of OCR engines configured to perform a character recognition process of the recognition image; and a designating part configured to designate the OCR engine by combining the recognition image and the OCR engine; wherein the character recognition process is implemented by using the OCR engine designated by the designating part.

The designating part may designate the OCR engine corresponding to the state of the recognition image obtained by the obtaining part. The designating part may designate the OCR engine corresponding to a process being an object of the recognition image. The OCR engines corresponding to the processes being the objects of the recognition image may be designated and the processes are concurrently implemented.

It may be also the aspect of the present invention to provide a document OCR implementing device, including: reading means for reading a document and forming a recognition image; obtaining means for performing image processing of the recognition image and obtaining a state of the recognition means; a plurality of OCR engines configured to perform a character recognition process of the recognition image; and designating means for designating the OCR engine by combining the recognition image and the OCR engine; wherein the character recognition process is implemented by using the OCR engine designated by the designating means.

It may be also the aspect of the present invention to provide a document OCR implementing method, including: reading steps reading a document and forming a recognition image; obtaining steps performing image processing of the recognition image and obtaining a state of the recognition image; and designating step designating an OCR engine configured to perform a character recognition process of the recognition image, by combining the recognition image and the OCR engine; wherein the character recognition process is implemented by using the OCR engine designated at the designating step.

According to the above-mentioned invention, it is possible to provide a document OCR implementing device and document OCR implementing method wherein, for character recognition of the recognition image obtained by reading a paper manuscript, plural OCR engines for recognizing are installed, and OCR engines proper for processes for the recognition image and states of the recognition images are selected so that a proper character recognition process can be efficiently implemented.

Other objects, features, and advantages of the present invention will become more apparent from the following detailed description when read in conjunction with the accompanying drawings.

BRIEF DESCRIPTION OF THE DRAWINGS

FIG. 7 is a view showing a management setting table of setting information for a manager;

FIG. 8 is a view showing an individual setting table of individual setting information;

FIG. 12 is a setting screen of a sending option displayed on the display device.

DETAILED DESCRIPTION OF THE PREFERRED EMBODIMENTS

A description of the present invention is now given, with reference to FIG. 1 through FIG. 11, including embodiments of the present invention.

The following embodiment of the present invention is an example where the present invention is applied to so-called digital color multifunction processing machine where a copying function, facsimile function, printing function, scanner function, function for providing an input image (a document image read out by the scanner function or an image input by the printing function or the facsimile function), and others, are combined.

Figure 1:
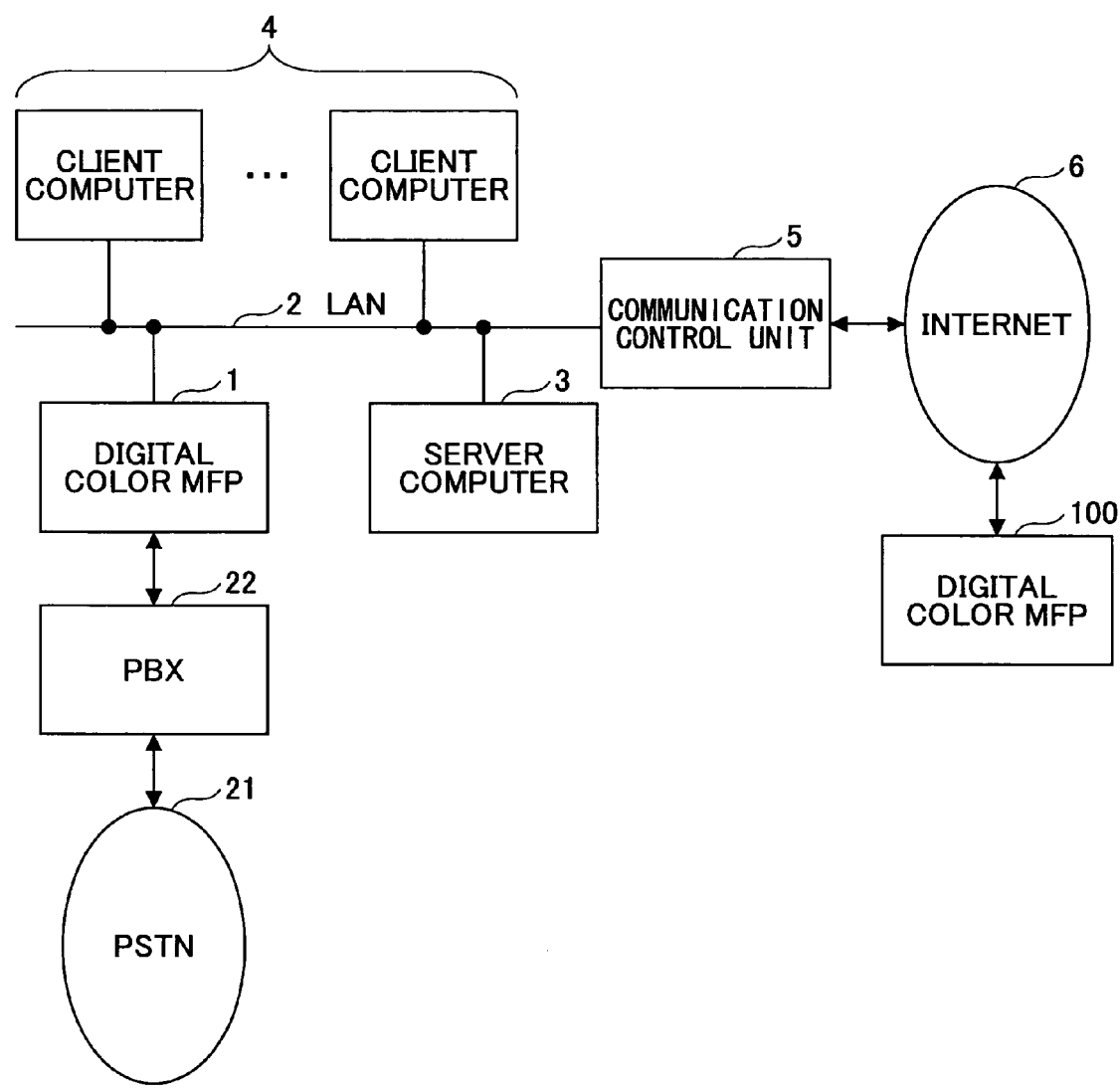
FIG. 1 is a system structural view including a digital color multifunction processing machine of an embodiment of the present invention.

FIG. 1 is a system structural view including a digital color multifunction processing machine of an embodiment of the present invention.

As shown in FIG. 1, in the embodiment of the present invention, a system having the following structure is assumed. A server computer 3 and plural client computers 4 are connected to a digital color multifunction processing machine 1 that is an information processing system via a LAN (Local Area Network) 2 that is a communication network.

The server computer 3 implements various kinds of information processes. For example, the server computer 3 supports FTP or HTTP protocol or realizes a function of a Web server or DNS server (Domain Name Server).

In other words, in this system, an environment where an image processing function of the digital color multifunction processing machine 1 such as an image input function (scanner function), image output function (printing function), image storing function, and others, can be jointly shared on the LAN 2.

Such a system is connected to the Internet 6 via a communication control unit 5 so that data communication between this system and an external environment can be performed via the Internet 6. In addition a digital color multifunction processing machine 100 is provided on the Internet 6. The digital color multifunction processing machine 100 has the same function as the digital color multifunction processing machine 1.

While a router, exchange, modem, DSL modem, or the like is normal as the communication control unit 5, it should be capable of TCP/IP communications as a minimum. In addition, the LAN 2 is not limited to wire communications but may use wireless communication (infrared, electromagnetic wave, or the like). An optical fiber may be used for the LAN 2.

Next, details of the digital color multifunction processing machine 1 are discussed. The explanation of the digital color multifunction processing machine 1 is, of course, applied to the digital color multifunction processing machine 100.

Figure 2:
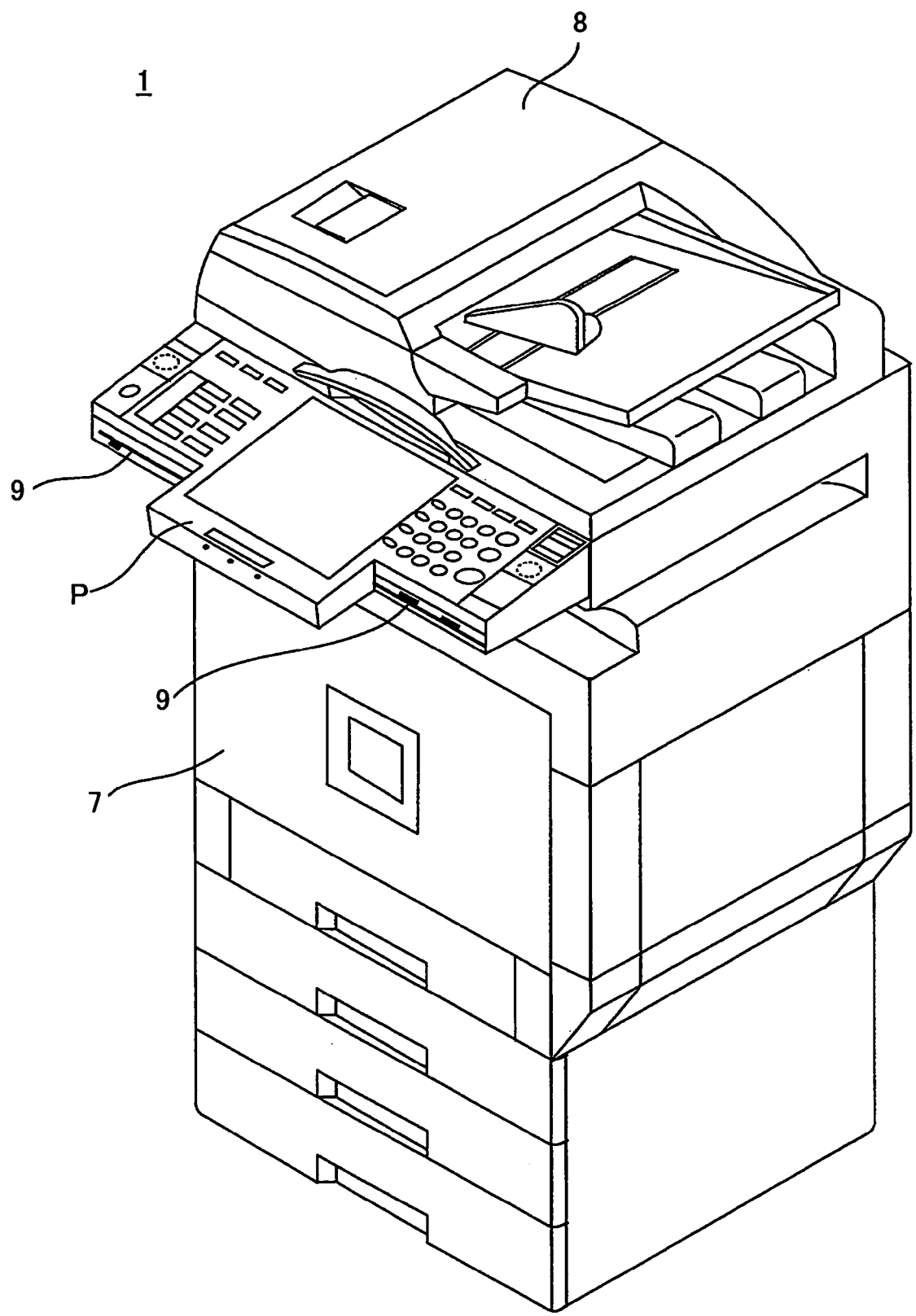
FIG. 2 is a schematic perspective view of the digital color multifunction processing machine.
Figure 3:
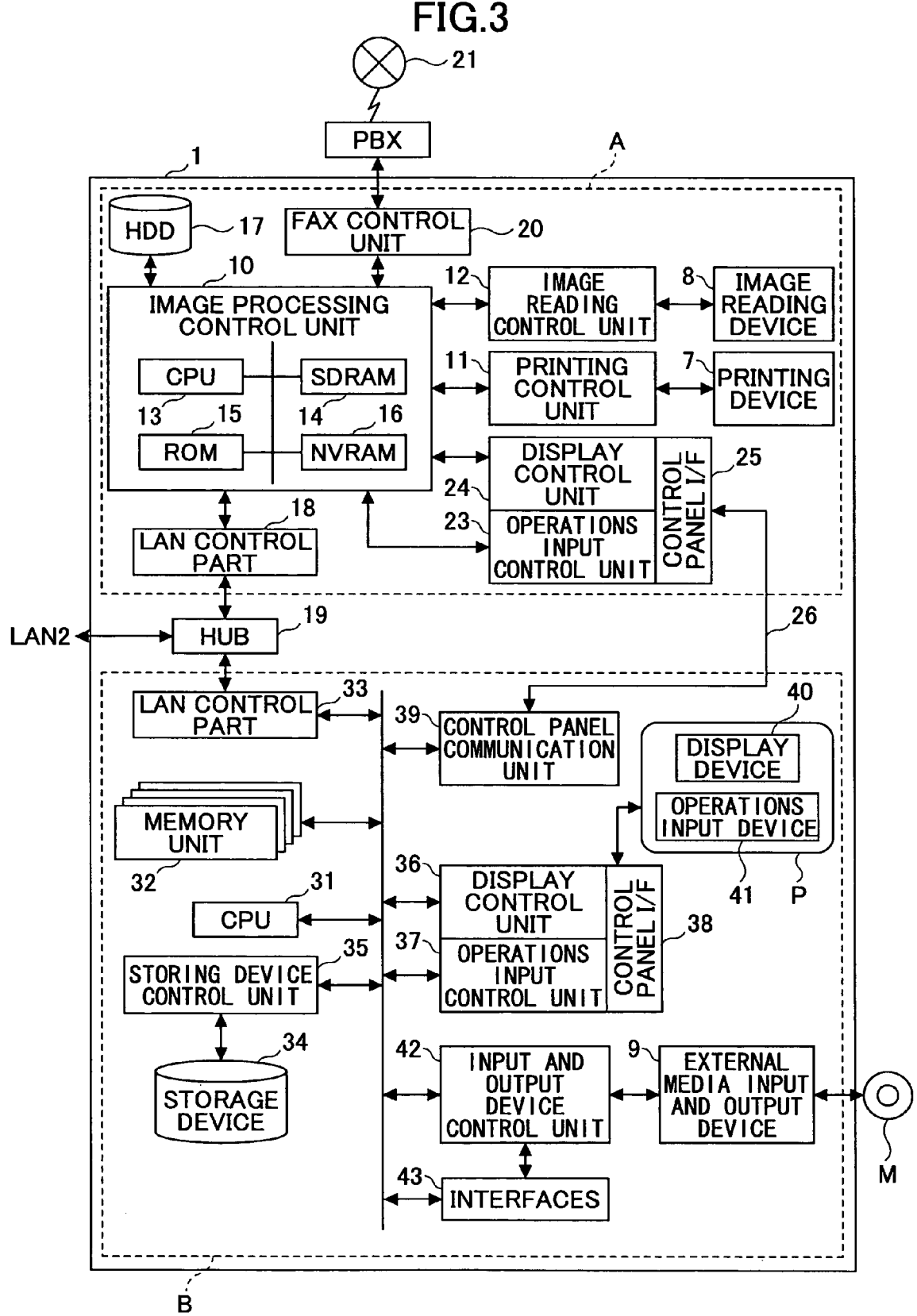
FIG. 3 is a block diagram showing electric connections of parts of the digital color multifunction processing machine.

Here, FIG. 2 is a schematic perspective view of the digital color multifunction processing machine 1. FIG. 3 is a block diagram showing electric connections of parts of the digital color multifunction processing machine 1.

As shown in FIG. 2, in the digital color multifunction processing machine 1, an image reading device 8 is provided at an upper part of a printing device 7. The printing device 7 forms an image on a medium such as a transferring paper. The image reading device 8 reads out the image from a manuscript. An operations panel P is provided at an outside surface of the image reading device 8. The operations panel P displays for an operator and accepts various inputs such as function setting by the operator.

In addition, an external media input and output device 9 is provided at a lower part of the operations panel P so that an inserting opening for receiving a storage medium M (See FIG. 3) is exposed to the outside. The storage medium M is, for example, an optical disk or flexible disk. The external media input and output device 9 reads out program code, image data, or the like stored in the storage medium M and writes the program code, the image data, or the like to the storage medium M.

As shown in FIG. 3, the digital color multifunction processing machine 1 includes an image processing unit part A and an information processing unit part B. A printing device 7 and an image reading device 8 belong to the image processing unit part A. The operations panel P and the external media input and output device 9 belong to the information processing unit part B for performing various information processes.

First, the image processing unit part A is discussed. As shown in FIG. 3, the image processing unit part A having the printing device 7 and the image reading device 8 includes the image processing control unit 10. The image processing control unit 10 implements control of the entire imaging process at the image processing unit part A. A printing control unit 11 and an image reading control unit 12 are connected to the image processing control unit 10. The printing control unit 11 controls the printing device 7. The image reading control unit 12 controls the image reading device 8.

The printing control unit 11 outputs a printing order including the image data to the printing device 7 following the control of the image processing control unit 10. The printing control unit 11 makes the printing device 7 form the image on the transferring paper and output it. Full color printing can be performed by the printing device 7. As a printing method, not only an electrophotographic method but also various types of methods such as an inkjet type, a sublimation thermal transferring type, a silver photographing type, a direct thermal recoding type, or a melting thermal transferring type, can be used.

An image reading control unit 12 drives the image reading device 8 under the control of the image processing control unit 10. The image reading control unit 12 condenses a reflection light of lamp irradiation against the surface of a manuscript onto a light receiving element (for example, CCD (Charge Coupled Device)) by a mirror or lens so as to read it, and makes A/D conversion so as to generate digital image data of RGB 8 bits.

The image processing control unit 10 has a microcomputer structure where a CPU (Central Processing Unit) 13 being a main processor, an SDRAM (Synchronous Dynamic Random Access Memory) 14, a ROM (Read Only Memory) 15, and an NVRAM (Non Volatile RAM) 16 are connected by a bus. The image data read by the image reading device 8 is stored in the SDRAM 14 for a while for image forming by the printing device 7. A control program or the like is stored in the ROM 15. The NVRAM 16 can store the data even at the time of electric power loss when a system log, system setting or log information is recorded.

In addition, an HDD (magnetic disk device) 17, a LAN control part 18 and a FAX control unit 20 are connected to the image processing control unit 10. The HDD 17 is a storing device for storing a large amount of image data or job history. The LAN control part 18 connected the image processing unit part A to the LAN 2 via a HUB 19 that is a line concentrator of an internal LAN provided inside of the device. The FAX control unit 20 implements facsimile control. The FAX control unit 20 is connected to a PBX (Private Branch exchange) 22 connected to a public switched telephone network 21, so that the digital color multifunction processing machine 1 can make contact with a remote facsimile via the public switched telephone network 21.

In addition, a display control unit 23 and an operations input control unit 24 are connected to the image processing control unit 10.

The display part 23 outputs an image display control signal to the information processing unit part B via a communication cable connected to a control panel I/F (interface) 25 by control of the image processing control unit 10. The display part 23 implements control of the image display of the operations panel P of the information processing unit part B.

The operations input control unit 24 inputs an input control signal via the communication cable 26 connected to the control panel I/F 25 by the control of the image processing control unit 10. The input control signal corresponds to functional settings or input operations by the operator from the operations panel P of the information processing unit part B. In other words, the image processing unit part A directly monitors the operations panel P of the information processing unit part B via the communication cable 26.

Therefore, the image processing unit part A connects the communication cable 26 to an image processing unit which a conventional image processing device has so as to use the operations panel P of the information processing unit B. In other words, the operations input control unit 24 and the display control unit 23 of the image processing unit part A operate being connected to the operations panel P.

Under this structure, the image processing unit part A analyzes a printing order command and printing data that are image information from the outside such as the server computer 3, the client computer 4, the facsimile, or the like, so as to convert the printing data into bit-map data to be printed as the output image data. The image processing unit part A analyzes the printing data from the command and determines the operation. The image processing unit part A receives the printing data and the command from the LAN control part 18 or the FAX control unit 20 and operates on them.

In addition, the image processing unit part A can transfer the printing data, manuscript reading data, output image data made by processing these data for output, and compressed data made by compressing these data to the outside such as the server computer 3, the client computer 4, the facsimile, or the like.

Furthermore, the image processing unit part A transfers the reading data of the image reading device 8 to the image processing control unit 10, corrects signal degradation due to quantization of an optical system or a digital signal, and writes the image data in the SDRAM 14. Thus, the image data stored in the SDRAM 14 are converted to the output image data by the printing control unit 11 so as to be output to the printing device 7.

Next, the information processing unit part B having the operations panel P is discussed. As shown in FIG. 3, the information processing unit part B has a microcomputer structure where the information processing unit part B is controlled by a generic OS (Operating System) used for an information processing device generally called a personal computer. The information processing unit part B includes a CPU 31 as a main processor. A memory unit 32 and a storing device control unit 35 are connected by a bus to the CPU 31. The memory unit 32 includes a RAM that is a work area of the CPU 31 and a ROM that is exclusively a reading memory where a starting program is stored. The storing device control unit 35 controls input and output of the data to and from the storing device 34 such as an HDD storing a program or the OS.

A LAN control part 33 is connected to the CPU 31. The LAN control part 33 is a communication interface for connecting the information processing unit part B to the LAN 2 via the HUB 19. An IP address that is a network address allocated to the LAN control part 33 is different from the IP address allocated to the LAN control part 18 of the image processing unit part A. In other words, two IP addresses are allocated to the digital color multifunction processing machine 1 of the embodiment of the present invention. The image processing unit part A and the information processing unit part B are respectively connected to the LAN 2. Data conversion between the image processing unit part A and the information processing unit part B can be performed.

Since the digital color multifunction processing machine 1 is connected to the LAN 12 via the HUB 19, only a single IP address is seemingly allocated. Therefore, it is possible to easily handle connections without damaging a fine appearance.

Figure 4:
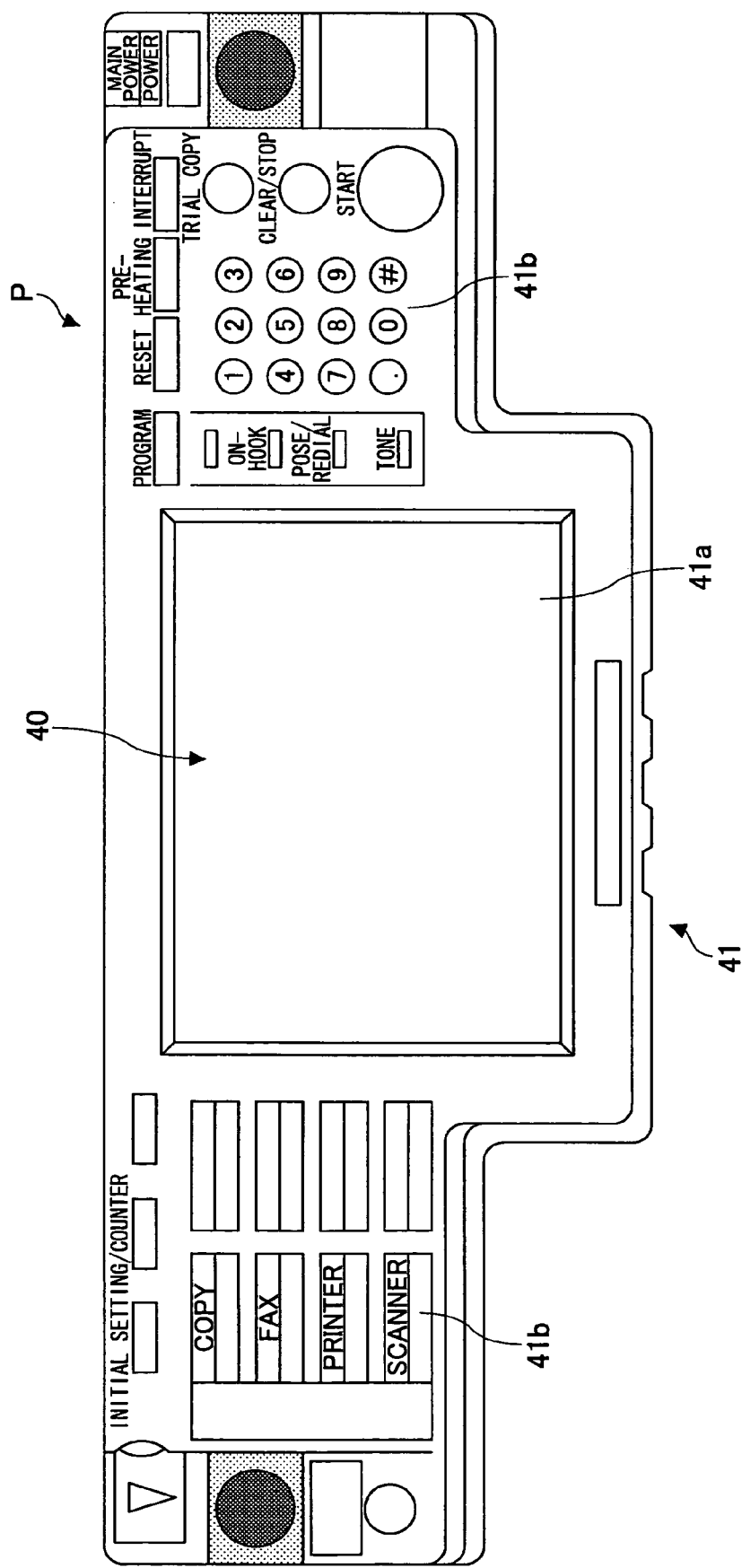
FIG. 4 is a plan view showing a structure of an operations panel.

In addition, a display control unit 36 and an operations input control unit 37 for controlling the operations panel P are connected to the CPU 31. FIG. 4 is a plan view showing a structure of the operations panel P. As shown in FIG. 4, the operations panel P includes a display device 40 and an operations input device 41. The display device 40 is, for example, LCD (Liquid Crystal Display). The operations input device 41 includes a touch panel 41a and a key board 41b. The touch panel 41a is an ultrasonic elastic wave type panel stacked on a surface of the display device 40. The key board 41b has plural keys.

A start key, ten-key, reading condition setting key, clear key, and others are provided on the key board 41b. The start key is used for starting a process such as an image reading process. The ten key is used for input a numerical value. The reading condition setting key is used for setting the address to which the read image data are sent. In other words, the display control unit 36 outputs the image display control signal to the display device 40 via the control panel I/F 38 so as to make the display device 40 display a designated item corresponding to the image display control signal. On the other hand, the operations input control unit 37 receives an input control signal via the control panel I/F 38. This input control signal corresponds to functional settings or input operations by the operator in the operations input device 41.

In addition, a control panel communication unit 39 is connected to the CPU 31. The control panel communication unit 39 is connected to the control panel I/F 25 of the image processing unit part A via the communication cable 26.

The control panel communication unit 39 receives the image display control signal output from the image processing unit part A. The control panel communication unit 39 also transfers the input control signal corresponding to the functional setting or input operations from the operations panel P by the operator, to the image processing unit part A.

As discussed below, the image display control signal from the image processing unit part A received by the control panel communication unit 39 is processed for data conversion for the display device 40 of the operations panel P and then output to the display control unit 36.

In addition, the input control signal corresponding to the functional settings or input operations from the operations panel P by the operator is converted to a format corresponding to a specification of the image processing unit part A and then input to the control panel communication unit 39.

As discussed above, the OS or program implemented by the CPU 31 is stored in the storing device 34. This means that the storing device 34 functions as a storage medium storing the program.

In the digital color multifunction processing machine 1, if the user turns on the electric power, the CPU 31 activates a starting program in the memory unit 32 so that the OS is read from the storage device 34 and written by the RAM in the memory unit 32 so that this OS is activated. Such an OS activates a program corresponding to the operation of the user and reads and stores the information. For example, Windows (Registered Trademark) and others are each known as such an OS. An operating program used for the OS is called an application program. The same type of OS used for the information processing device such as the server computer 3 or the client computer 4, namely a generic OS such as Windows (Registered Trademark) is used as the OS of the information processing unit part B.

As discussed above, the external media input and output device 9 is provided in the digital color multifunction processing machine 1. The external media input and output device 9 is a device for reading the program code or the image data stored in a storage medium M or for storing the program code or the image data in the storage medium M, such as a flexible disk drive device, an optical disk drive device, an MO drive device, or a media drive device. The storing medium M is a medium where various program code sets (control programs) such as various application programs, the device driver, or the OS is stored. The storing medium M is, for example, a flexible disk, a hard disk, an optical disk (CD-ROM, CD-R, CD-RW, DVD-ROM, DVD-RAM, DVD-R, DVD+R, DVD-RW, DVD+RW, and others), or a semiconductor medium (SD memory card (registered trademark), Compact Flash (registered trademark), Memory Stick (registered trademark), Smart Media (registered trademark), or the like). Such an external media input and output device 9 is controlled by an input and output device control unit 42 that is connected by bus to the CPU 31.

Accordingly, the application program stored in the storage device M may be installed in the storage device 34. Because of this, the storage medium M can be the storage medium storing the application program. In addition, the application program may be taken in from the outside via, for example, the Internet or LAN 2 so as to be installed in the storage device 34.

Various interfaces 43 such as USB, IEEE 1394, and SCSI are connected to the input and output device control unit 42. Hence, via the various interfaces 43, various devices such as a digital camera can be connected to the input and output device control unit 42.

Next, a specific process implemented by the digital color multifunction processing machine 1 is discussed. In the digital color multifunction processing machine 1, plural devices implementing different processes from each other, namely the image processing unit part A and the information processing unit part B in this example, can independently perform the processes. Therefore, when the image reading process is implemented by the image processing unit part A, the information processing unit part B can receive e-mail, for example. In this example, since the results of the processes do not affect each other, there is no problem in independent operations of the image processing unit part A and the information processing unit part B.

Furthermore, in the digital color multifunction processing machine 1, each of the functions of the image processing unit part A can be used by the program operated by the information processing unit part B and the result can be a subject of the processing. For example, image data of a document image read by the image reading device 8 of the image processing unit part A is character-recognition processed by a designated application program so that a text document can be obtained.

However, if the image processing unit part A and the information processing unit part B always perform the processes independently from each other, each of the functions of the image processing unit part A cannot be used by the program operated by the information processing unit part B and the result cannot be the subject of the processing. Because of this, in this example, each of the functions of the image processing unit part A cannot be used by operating the application program based on the combination of process modules.

In the image processing unit part A, a module of a control system executed by the image processing control unit 10 is formed by an application program for implementing original functions of a multifunction processing machine by the digital color multifunction processing machine 1. In the digital color multifunction processing machine 1, an interface of a functional module for a network is provided at the LAN control part 18 to which access from only the information processing unit part B via the HUB 19 (LAN 2) can be made.

Based on the functional module for the network, a function provided for a normal multifunction processing machine as a standard and implemented by the image processing control unit 10, such as the scanner function or facsimile function, can be used via the LAN 2. The function cannot be used by the image processing unit part A.

When TCP/IP (Transmission Control Protocol/Internet Protocol) detects a connection requirement for a corresponding port number, a process module of a corresponding function is activated. Here, the TCP/IP always monitors access from the LAN 2.

For example, when the connection of the port number 1002 is requested, a module of a facsimile receiving function is activated. The activated module operates based on the processing requirement from a side requesting the connection so as to reply with a necessary response.

Next, a specific feature of an application program of the information processing unit part B is discussed. A key word generation application is discussed as an example.

The keyword generation application implements the character recognition process for the image data being read so that a keyword is made from the result of the character recognition. In the entirety of the information processing unit part B, each of the application programs is executed under the management of the OS.

In addition, each of the application programs can use the functions provided by the OS. In other word, while the application program is executing the OS is used as a module of the software so that a necessary process is performed. For example, the TCP/IP control module implements a function provided in the OS as a standard, the function being used for communication with other information devices connected by the TCP/IP.

Furthermore, an independent application program installed for use by other application programs can be used. For example, an OCR engine implements only a character recognition process from the image data. Since the OCR engine does not operate individually, the OCR engine is used as a part (module) of other application programs.

Thus, since each of the application programs can be executed under the management of the OS in the entirety of the information processing unit part B, an application program having these functions can be developed.

However, in the conventional technology, the functions of the image processing unit part A and others cannot be directly used by such means.

In other words, as discussed above, in the digital color multifunction processing machine 1, the image processing unit part A for implementing the original function of the multifunction processing machine and the information processing unit part B for implementing the application programs are provided. The image processing unit part A and the information processing unit part B are connected to each other via the LAN 2 by the network protocol (TCP/IP in this example) in the digital color multifunction processing machine 1.

Since the image processing unit part A and the information processing unit part B are physically connected, it is possible to mutually communicate data between the image processing unit part A and the information processing unit part B. However, in the conventional technology, the function of the image processing unit part A cannot be used from inside of the application program executing in the information processing unit part B.

Here, means for using the function of the image processing unit part A from inside of the application program executing in the information processing unit part B are discussed.

For example, in the keyword generation application, the image data are read from the image reading device 8 managed by the image processing unit part A.

In order to instruct the image reading device 8 to perform image reading operations, it is necessary to designate the port number 1001 and request a TCP/IP connection to the image processing unit part A. At this time, data indicating the contents of the process are simultaneously sent as a data stream.

In the function designated by the port number 1001, the image reading device 8 reads the image. An optional file name is added to the image data and the image data are transferred to the information processing unit part B. The contents of such a process are determined in advance. The port number is allocated so that these functions are individually used.

Thus, the functions of the image processing unit part A can be used from the keyword generation application. The communication protocol is not limited to TCP/IP but may be other types of protocols.

The digital color multifunction processing machine 1 of the embodiment of the present invention basically has a scanner function, an image processing function, a media browser function, a document browser function, a page browser function, a form synthesizing function, a sending/storing function, a printing function, an OCR function, a searching function, a facsimile function, a mail server function, a Web server function, a periodic implementation function, a system monitoring function, a security function, a hysteresis/status display function, an individual setting function, a manager setting function, and others. Each of the functions is briefly discussed below.

In the scanner function, the paper document is read out in an image file form so as to be sent or be stored inside as an e-mail, facsimile, or a file (Windows (registered trademark) common folder, FTP folder, Web folder, outside server, or the like).

In the media browser function, files stored in respective media of a recording medium M can be read. The Windows (registered trademark) common folder on the network, FTP, Web folder, or the like is set as a common medium by individual setting so that it can be read by the same operation as that of the recording medium M.

In the document browser function, a group (document) of files such as stored normal documents (including a document stored for a file), received e-mail (including attached files such as images), a received facsimile, or the like can be operated on and read. In addition, the document browser function includes a document management function so that the name of the document can be changed and the document can be deleted. In the stored document, OCR characters in the image can be searched for by the OCR function discussed below and downloads from the Web can be performed.

In the page browser function, the stored document or the image read or selected for sending or printing is confirmed, so that the image in the main body can be displayed. A selection function for file sending, storing, printing, reading or editing of various information items of the file can be performed.

In the image processing function, there is an automatic image processing function whereby an image operation before sending, storing or printing can be performed. It is possible to make image quality corrections, perform rotation, reduce colors, and cut the image to and remove white paper.

In the form synthesizing function, position information (form) with a background where text or an image is provided is selected so that a new image is synthesized before being sent, stored or printed.

In the sending/storing function, an image or a file selected by the paper manuscript (scanner), the media browser, or the document browser (page browser) can be sent by mail or facsimile to a designated opponent, or a file sent to common media or outside server. In addition, as discussed above, because of storing, an OCR-processed character line can be searched for or downloading from the Web.

In the printing function, the image or the file selected by the media browser or the document browser (page browser) can be printed by designating various layouts (forms).

In the OCR function, text of the image obtained by the scanner function or received facsimile image is extracted by character recognition (OCR). The PDF file (image PDF+ OCR) where the text is provided is formed so as to be sent or stored. In the OCR function, there is an all sentences searching function of the stored document, and an OCR address or document name function used for the address or document name from the character line in the file. This OCR address is where an OCR character line of a designated region is consistent with a registered address. The OCR document name is a document name of the OCR character line of the designated region.

In the searching function, a file is extracted from the images or the file stored or existing on the common media (network) by using the document name, the file name, storing day and time, changing day and time, the OCR text (the character line where the OCR image processed is a subject) as a key word so that a file whose contents are consistent is displayed.

In the facsimile function, image information received from a facsimile communication port (such as G3-1, G3-2, G4-1 or the like) prepared by the digital color multifunction processing machine 1 is converted to the image file and the image file is divided and forwarded (e-mail forwarded or facsimile forwarded). The received facsimiles are divided based on senders by the initial setting or addresses by the receiving port. In addition, the image file from the paper document, the media document, or the stored document can be transferred by facsimile or the image attached to the received e-mail can be forwarded to another facsimile device.

In the mail server function, there are a function for sending e-mail, a function for forming and storing e-mail addresses of guests and individuals inside (at the time of SMTP (Simple Mail Transfer Protocol) setting), a function for one-touch operation of automatic printing, facsimile transferring, sending or storing an image attached to the received e-mail, and a function for sending back an operation result e-mail to the sender.

Here, several operation combinations of the received e-mail addresses are prepared for every guest or individual. The setting and change are implemented in the individual setting. In addition, e-mail addresses (at the time of POP (Post Office Protocol) receiving setting) of a single outside e-mail server are divided by the e-mail address indication name so that the same operation as the operation at the time of SMTP setting can be performed.

In order to correspond to various e-mail environments, e-mail sending corresponds to the SMTP identification and "POP before SMTP" mode. E-mail receiving corresponds to APOP (Authenticated Post Office Protocol), too.

In the Web server function, a URL is prepared for the guest and the individual, so that the image or file stored inside can be read, searched, downloaded, uploaded, sent, stored, and printed. In addition, the result of the operation can be referred to and the individual or the manager can be set. Furthermore, this function corresponds to SSL (Secure Socket Layer) sever identification in considering security during the communication.

In the periodic implementation function, deletion of storing data whose storing time passes, receiving the POP e-mail, the renewal of the LDAP (Lightweight Directory Access Protocol), automatic printing or deletion of hysteresis, and auto restarting can be done.

In the system monitoring function, disk full, abnormality generated inside of the machine, tray or door open information or paper jamming is detected so that a screen message urging the user including a service call screen is displayed. In addition, it is possible to correspond to an accounting device monitoring or limiting the use of the user.

In the security function, in order to protect data from illegal operation by an unknown user (guest user) or outside network, security (individual identification function, manager password, or the like) against the user of the operation part and security (e-mail sending identification, APOP, SSL Server identification of Web, access limitation or the like) against the network is provided.

In the hysteresis/status display function, whether the result of receiving, sending and printing of the e-mail, facsimile, or file is normal, the date and time of implementation or completion, and contents of job cancellation or errors can be confirmed.

In the individual setting function, it is possible to register the environment settings for every individual while avoiding a situation where a third party sees the user environment (registration of the address of the e-mail, customized operation and screen, received e-mail address, and others) of the individual user.

In the manager setting function, various setting function against the user, basic operating the functions (network setting, time setting automatic restarting time), and management functions (user management, e-mail environment setting, received facsimile setting) can be implemented.

Figure 5:
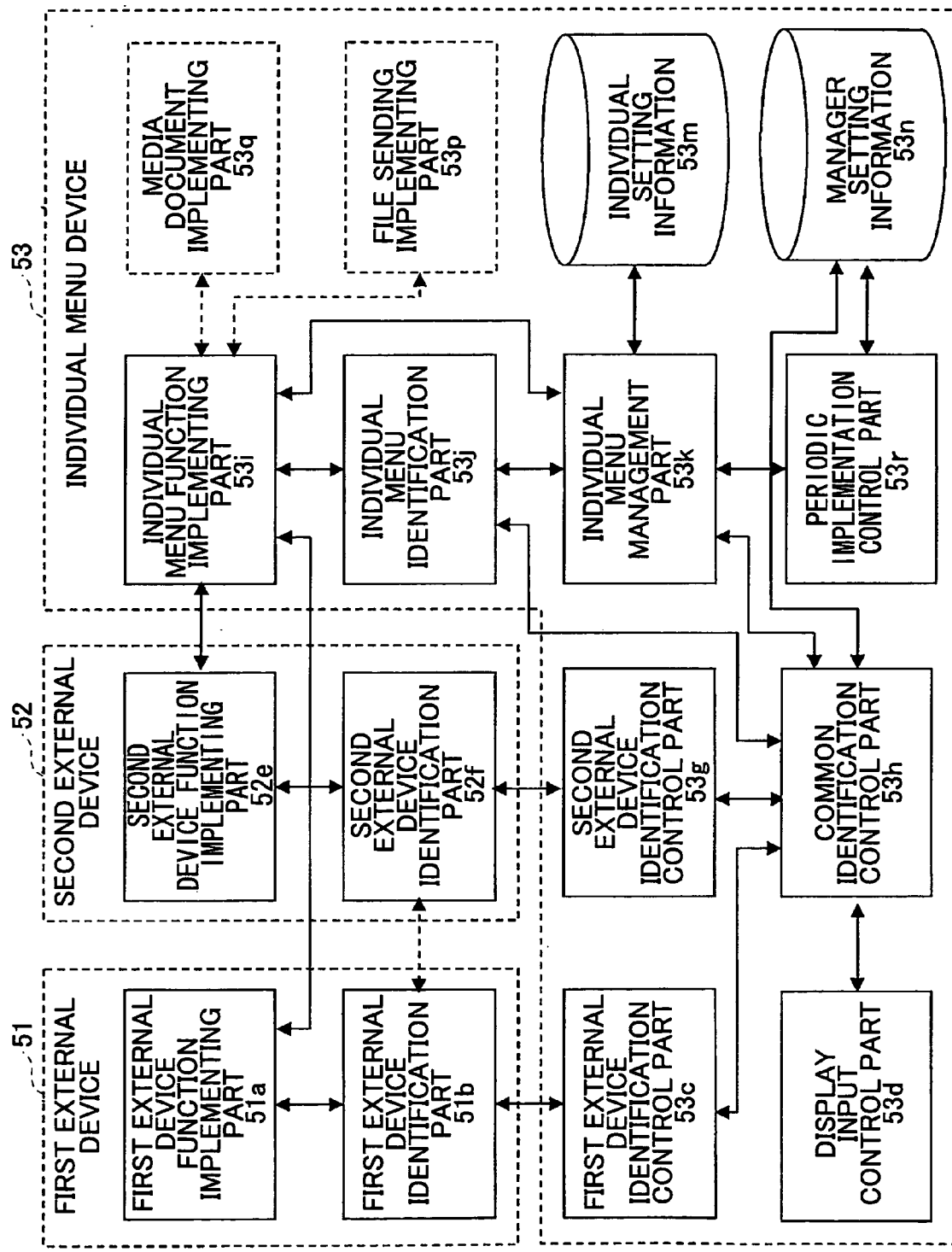
FIG. 5 is a block diagram showing a functional structure for controlling identifying action in the embodiment of the present invention.

FIG. 5 is a block diagram showing a functional structure for controlling identifying action in the embodiment of the present invention. In FIG. 5, arrows connecting blocks represent main flows of signals. This does not limit the function of each of the blocks. In addition, in FIG. 5, a first external device 51 corresponds to the server computer 3 shown in FIG. 1. A second external device 52 corresponds to the image processing unit part A shown in FIG. 3. An individual menu device 53 corresponds to the information processing unit part B shown in FIG. 3.

Figure 6:
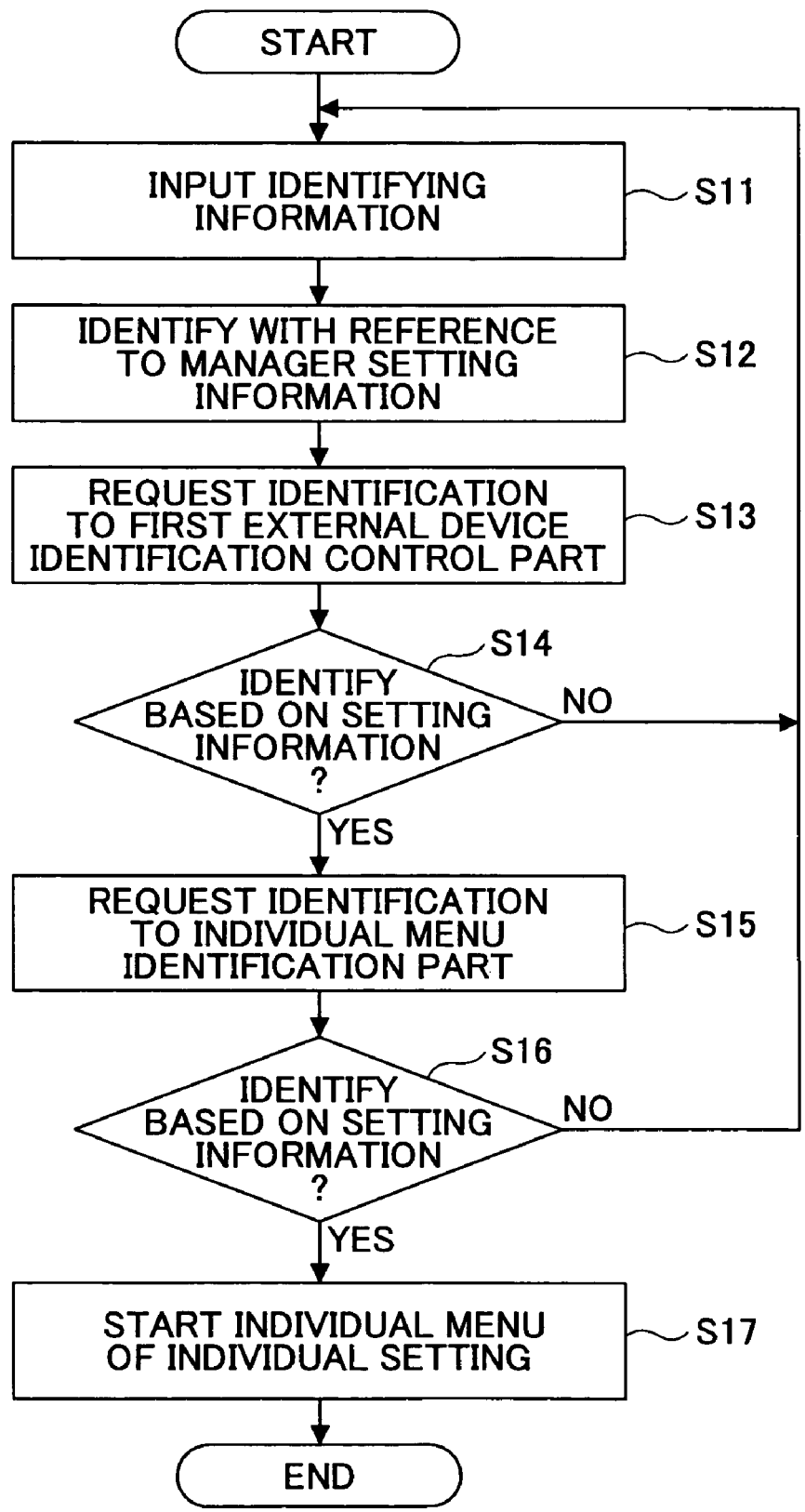
FIG. 6 is a flowchart showing an operation of identifying action of an individual menu device of the digital color multifunction processing machine of the embodiment of the present invention.

FIG. 6 is a flowchart showing an operation of identifying action of an individual menu device of the digital color multifunction processing machine of the embodiment of the present invention.

Based on the flowchart of FIG. 6, the operation in the embodiment of the present invention is discussed with reference to FIG. 5.

As an identifying action in the digital color multifunction processing machine 1 shown in FIG. 6, a display input control part 53d of the individual menu device 53 receives identifying information of the user (user name, password, ID card for identifying, and others) from the main picture displayed at the operations panel P (See FIG. 4), for example in step S11. The identifying information of the user is input from the input picture of the identifying information by pushing the individual identifying key.

The display input control part 53d transfers the input identifying information to a common identification control part 53h. The common identification control part 53h identifies the information following the setting of a manager setting information 53n in step S12. Here, in setting the manager setting information 53n, in a case where the item (1) of a management setting table shown in FIG. 7 is "EXTERNAL DEVICE IDENTIFICATION: YES", the identification is requested in order based on the setting of the item (2) of the management setting table "PRIORITY IDENTIFICATION SETTING: FIRST=FIRST EXTERNAL DEVICE, SECOND=INDIVIDUAL MENU DEVICE" in step S3.

One of "FIRST EXTERNAL DEVICE", "SECOND EXTERNAL DEVICE", and "INDIVIDUAL MENU DEVICE" is set as a first item of priority identification setting. The device which is priority identification set is indicated at the items (3) "FIRST EXTERNAL DEVICE IDENTIFICATION: YES" or (5) "SECOND EXTERNAL DEVICE IDENTIFICATION: YES".

In the case of the item (2) of the management setting table "PRIORITY IDENTIFICATION SETTING: FIRST=FIRST EXTERNAL DEVICE, SECOND=INDIVIDUAL MENU DEVICE", the common identification control part 53h requests, in step S13, the identification of the first external device from a first external device identification control part 53c by the identification information of the user input in step S11. The first external device identification control part 53c, in step S14, determines the identification with a first external device identification part 51b by an existing protocol. If this identification is not successful (NO in step S14), the identification flow of the user goes back to the beginning. If this identification is successful (YES in step S14), the common identification control part 53*h* request identification of the individual menu to a individual menu identification part 53*j* in step S5.

The individual menu management 53*k* determines, with reference to the individual setting information 53*m*, the requested identification in step S16. If the identification is successful (YES in step S16), the individual menu identification part 53*j* requests the individual menu function implementing part 53*i* to start the individual menu. If this identification is not successful (NO in step S16), the identification flow of the user goes back to the beginning.

The individual menu function implementing part 53*i* obtains the individual setting information 53*m* via the individual menu management part 53*k* so as to start the individual menu at the individual setting in step S17. Thus, the identification flow to the individual menu device 53 is implemented as discussed above. At this time, since the identification of the first external device identification part 51*b* is successful, the function of a first external device function implementing part 51*a* can be used from the individual menu of the individual menu function implementing part 53*i*.

Figure 9:
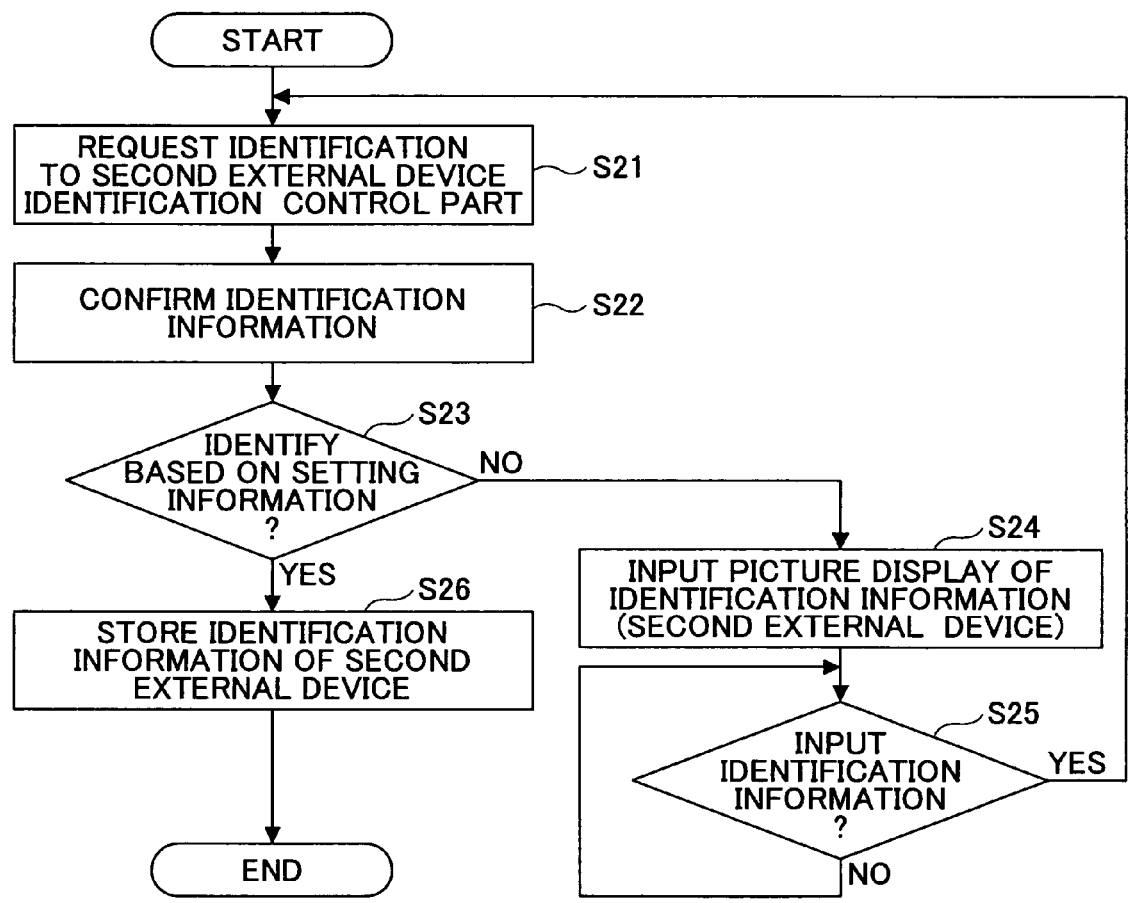
FIG. 9 is a flowchart showing an operation of identifying action of a second external device after the first external device and the individual menu device are identified, of the embodiment of the present invention.

Meanwhile, FIG. 9 is a flowchart showing an operation of additional identifying action of the second external device after the first external device and the individual menu device are identified.

Referring to FIG. 9, at the same time as starting the individual menu or corresponding to the request for using the function of the second external device, the common identification control part 53*h* requests the identification of the second external device from the second external device identification control part 53*g* in step S21 so that the second external device identification control part 53*g* implements identification with a second external device identification part 52*f*. At this time, the common identification control part 53*h* confirms so as to obtain "SECOND EXTERNAL DEVICE IDENTIFICATION INFORMATION" of the item (6) of the individual setting table shown in FIG. 8 in step S22. This "SECOND EXTERAL DEVICE IDENTIFICATION INFORMATION" of the item (6) of the individual setting table shown in FIG. 8 is the individual setting information 53*m* of the individual menu identified via the individual menu management part 53*k*. Here, the existence of registration of the identifying information or whether the information is the input identification information is confirmed.

In step S22, if the identification information is not registered at "SECOND EXTERAL DEVICE IDENTIFICATION INFORMATION" of the item (6) of the individual setting table shown in FIG. 8, since the identifying process with the first external device is already completed, the identification information identified by the first external device is used. If the identification information is registered at "SECOND EXTERAL DEVICE IDENTIFICATION INFORMATION" of the item (6) of the individual setting table shown in FIG. 8, the identification information is obtained and the second external device identification control part 53*g* implements identification with the second external device identification part 52*f* in step S23. If this identification is successful (YES in step S23), the individual menu function implementing part 53*i* can use the function of a second external device function implementing part 52*e*.

If this identification is not successful (NO in step S23), the common identification control part 53*h* displays an input dialog on the display input control part 53*d* again in step S24. This is displayed on a picture as the function of the second external device function implementing part 52*e* from the individual menu function implementing part 53*i*. Implementation of the function of the individual menu function implementing part 53*i* or the first external device function implementing part 51*a* is not obstructed.

If the user inputs correct identification information to the input dialog (display picture in step S13) (YES in step S25) the common identification control part 53*h* requests the second external device identification control part 53*g* to implement the identification with the second external device identification part 52*f* again in step S21. If the input identification information is confirmed in step S22 and determination of the identification based on this identification information is successful (YES in step S23), the common identification control part 53*h* stores, via the individual menu management part 53*k*, correct identification information in "SECOND EXTERAL DEVICE IDENTIFICATION INFORMATION" of the item (6) of the individual setting information 53*m* shown in FIG. 8 in step S26. This correct identification information is used next time when the second external device identification control part 53*g* implements the identification with the second external device identification part 52*f*.

As a result of this, in a case where "SECOND EXTERAL DEVICE IDENTIFICATION INFORMATION" of the item (6) of the individual setting table shown in FIG. 8 is not registered, the identification flow fails only the first time. However, in the identification flow after the second time, the stored information can be used. If the first external device is designated as the subject of the priority identification, the identification flow is completed by only the first external device and the individual menu device. The second external device implements the identification when the function of the second external device function implementing part 52*e* is used in the individual menu. Because of this, if the user registration of the first external device is identical with user registration of the individual menu, the identification flow is successful. The second external device may identify when the function is required.

By the identification action discussed above, it is possible to use functions of various devices connected to the network and the digital color multifunction processing machine 1.

Figure 10:
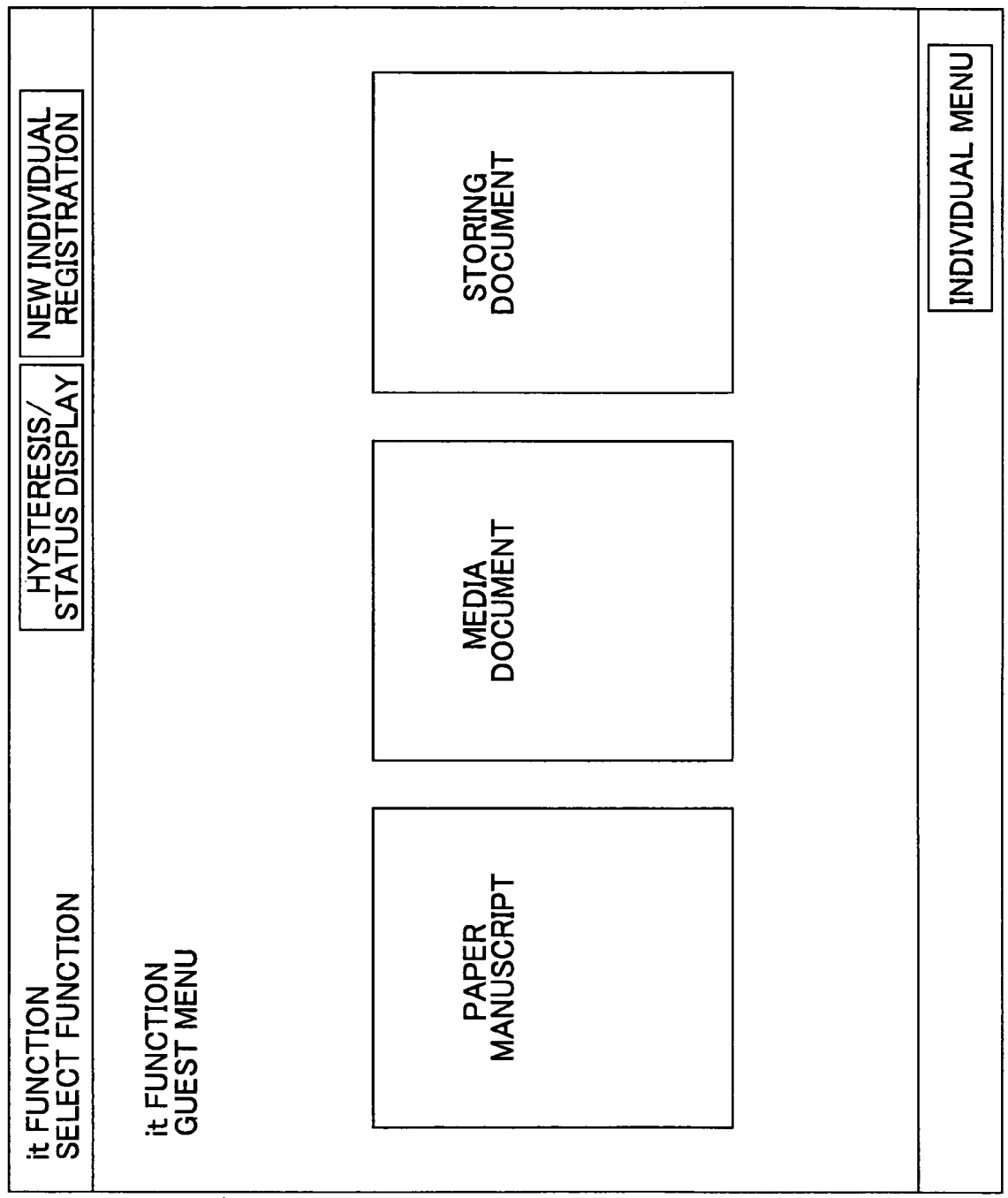
FIG. 10 is a view showing a main screen displayed on a displaying device.

The digital color multifunction processing machine 1 shown in FIG. 3 implements processes of "PAPER MANUSCRIPT", "MEDIA DOCUMENT" AND "STORING DOCUMENT" as shown on a main screen of FIG. 10. As discussed above, for example, in a case where the manuscript of the user read by the image reading device 8 is sent by the facsimile as the process of "PAPER MANUSCRIPT", an OCR process of the recognition image being read out is implemented so that a character line recognized in the manuscript can be used as an address (OCR address). Furthermore, in a case where the manuscript is stored to be used as material or the like, the OCR process is implemented so that all the manuscript sentences can be searched.

Figure 11:
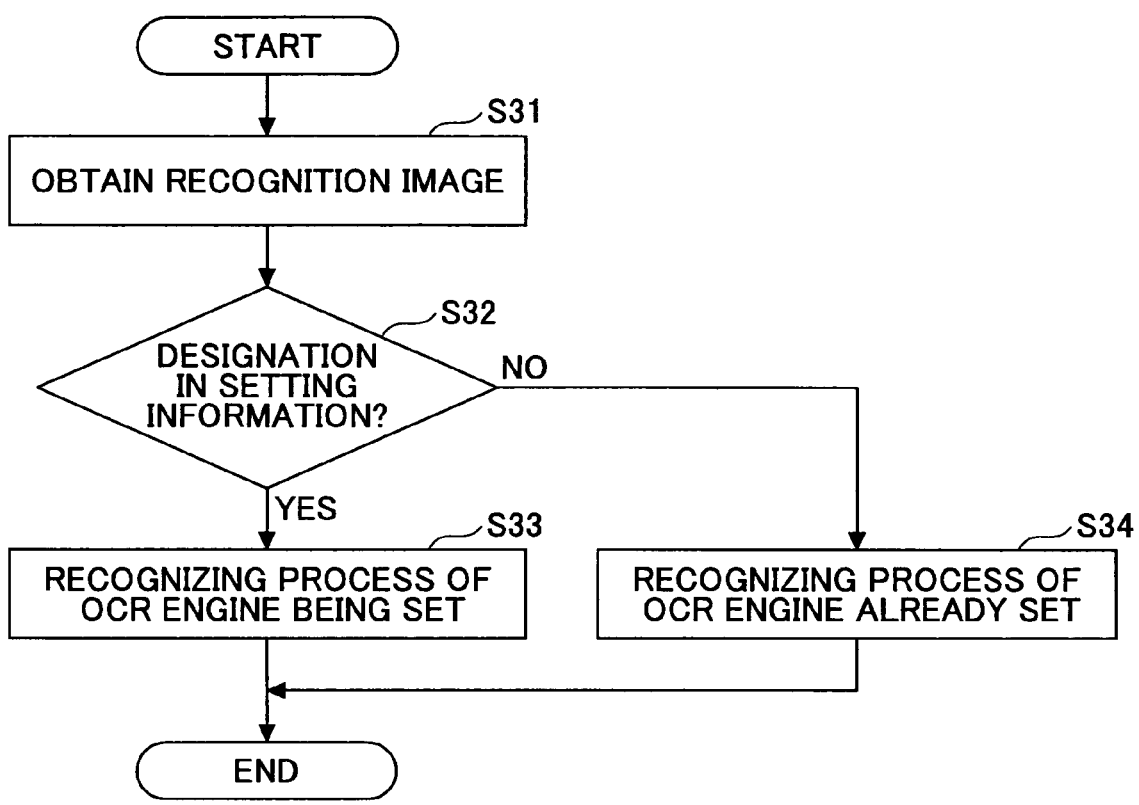
FIG. 11 is a flowchart showing a process for designating an OCR engine.

FIG. 11 is a flowchart showing a process for designating an OCR engine. As shown in FIG. 11, the recognition image read by the image reading device as a reading part, or a recognition image that is an object of a document file of a facsimile, an attached file in e-mail, or the e-mail is obtained by an obtaining part in step S21.

In addition, corresponding to a state of the recognition image obtained by an obtaining part or a process of the object of the recognition image, whether or not an OCR engine selected from plural OCR engines is set is confirmed in step S32. If the OCR engine is set (YES in step S32), the recognizing process is implemented by using the designated OCR engine in step S33. If the OCR engine is not set in step S32 (NO in step 22), the recognizing process is implemented by using the OCR engine already set in the device in step S34.

There are a lot of kinds and specific features in the OCR engines for recognizing characters of recognition images. For example, in the recognition images, there may be plural states such as black and white, color, or a partial table or an entire table. However, in the recognizing process of the OCR engine, there are advantages or disadvantages in the object of recognition, depending on the manufacturer, design idea, recognition language, or the like.

Accordingly, an OCR engine proper for the state of the recognition image is selected from plural OCR engines. For example, in a case where rule lines or characters of a foreign language are detected in the recognition image obtained by the obtaining part, an OCR engine proper for the recognizing process is selected or designated by the designating part so that a proper recognizing process can be implemented.

Since these OCR engines can individually work on the OS, the OCR engines can concurrently work every process of sending or receiving the recognition images. Not only a single OCR engine but also plural OCR engines may be selected for the recognizing process. In addition to the process being an object of the recognition image, as corresponding to the states of the recognition image, the OCR engine can be selected and set.

Thus, in the case where the OCR process is implemented, an OCR engine having precisions or speed suitable for a recognizing process having a different object can be selected from plural OCR engines so that a result desirable for the user can be obtained. In addition, a designating part designates the OCR engine. The OCR engine proper for processing the object of recognition adjusted to the work of the user or every user registered or identified in the region of the individual menu (individual setting table) by the individual setting function, can be individually set.

For example, for the process of the received facsimile document having an image whose resolution is not high, an OCR engine is set from the perspective that speed has the priority. For the process of the sent document, an OCR engine is set from the perspective that precision corresponding to characters one by one has the priority considering later use. In a case where a document file that is an object of recognition is written in English, an OCR engine for English can be designated for every process of the objects of settings.

FIG. 12 is a setting screen of a sending option displayed on the display device. A screen where the OCR implementing is selected is shown in FIG. 13.

Figure 13:
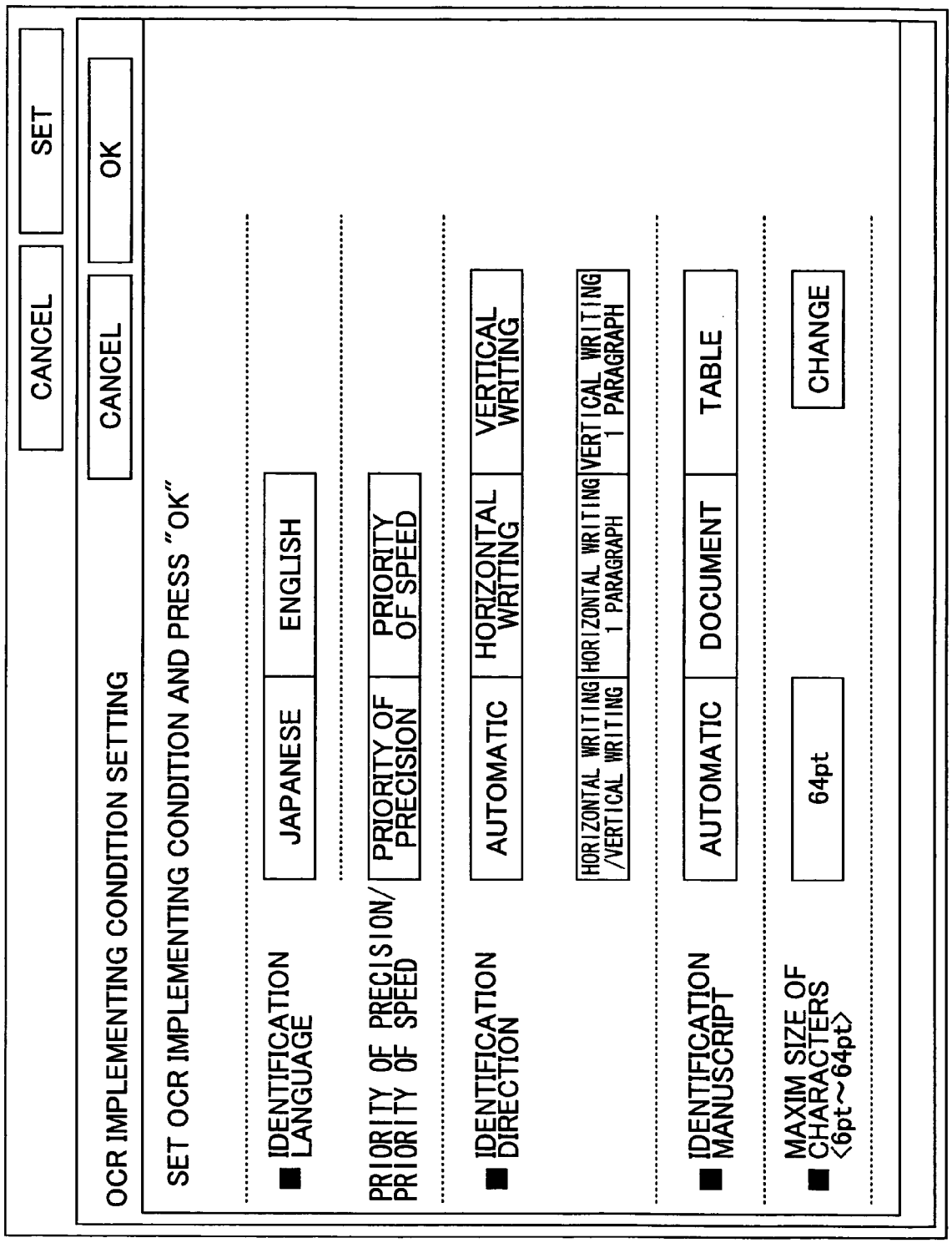
FIG. 13 is a setting screen of an OCR implementing condition displayed on the display device.

In the example shown in FIG. 13, selection and setting of the OCR engine having a precision priority or speed priority can be made. While a single OCR engine may have two selective modes of "PRIORITY OF PRECISION" and "PRIORITY OF SPEED", in this example, two selective OCR engines, one having a function of the priority of precision and the other having a function of the priority of speed, are provided.

Furthermore, in the digital color multifunction processing machine 1, in a case where a facsimile is received during a character recognizing process of the received document by the OCR engine for English, it is possible to concurrently implement the character recognizing process by the OCR engine for facsimile document as a background task.

In addition, in a case where a large volume of the document files such as Web pages are recognized, character recognition is made by plural OCR engines, the result of recognition by all of the OCR engines are stored as a single database, and this can be used for the search.

Thus, according to the above-mentioned examples of the present invention, it is possible to provide the document OCR implementing device and document OCR implementing method wherein, for character recognition of the recognition image obtained by reading a paper manuscript, plural OCR engines for recognizing are installed, and OCR engines proper for processes for the recognition image and states of the recognition images are selected so that a proper character recognition process can be efficiently implemented. The document OCR device is connected to the network, uses the communication protocol, and communicates the documents in various data forms with plural information devices.

The present invention is not limited to these embodiments, but variations and modifications may be made without departing from the scope of the present invention.

This patent application is based on Japanese Priority Patent Application No. 2005-251296 filed on Aug. 31, 2005, the entire contents of which are hereby incorporated by reference.

What is claimed is:

1. A document OCR implementing device, comprising:
a reading part configured to read a document and form a recognition image;
an obtaining part configured to perform image processing of the recognition image and obtain a state of the recognition image;
a plurality of OCR engines configured to perform a character recognition process of the recognition image; and
a designating part configured to designate one or more of the OCR engines by combining the recognition image and the one or more OCR engines,
wherein the character recognition process is implemented by using the one or more OCR engines designated by the designating part,
the designating part designates the one or more OCR engines corresponding to a process being an object of the recognition image, and
a plurality of the one or more OCR engines corresponding to the processes being the objects of the recognition image are designated and the processes are concurrently implemented, wherein upon receipt of a facsimile during the character recognition process of a received document by an OCR engine for English, the OCR implementing device is configured to implement the character recognition process for the facsimile using a different OCR engine, the character recognition process for the facsimile performed concurrently with the character recognition process for the received document.

2. The document OCR implementing device as claimed in claim 1, wherein one or more proper OCR engines for processing the object of recognition, adjusted to the work of the user or every user registered, are individually set.

3. A document OCR implementing device, comprising:
a reading part configured to read a document and form a recognition image;
an obtaining part configured to perform image processing of the recognition image and obtain a state of the recognition image;
a plurality of OCR engines configured to perform a character recognition process of the recognition image; and
a designating part configured to designate one or more of the plurality of OCR engines by combining the recognition image and the one or more OCR engines,
wherein the character recognition process is implemented by using the one or more OCR engines designated by the designating part,
the designating part designates the one or more OCR engines corresponding to the state of the recognition image obtained by the obtaining part, the designating part designates the one or more OCR engines corresponding to a process being an object of the recognition image, and a plurality of the one or more independent OCR engines corresponding to the processes being the objects of the recognition image are designated and the processes are concurrently implemented, wherein upon receipt of a facsimile during the character recognition process of a received document by an OCR engine for English, the OCR implementing device is configured to implement the character recognition process for the facsimile using a different OCR engine, the character recognition process for the facsimile performed concurrently with the character recognition process for the received document.

4. The document OCR implementing device as claimed in claim 3, wherein one or more proper OCR engines for processing the object of recognition, adjusted to the work of the user or every user registered, are individually set.

5. A document OCR implementing device, comprising:

reading means for reading a document and forming a recognition image;

obtaining means for performing image processing of the recognition image and obtaining a state of the recognition means;

a plurality of OCR engines configured to perform a character recognition process of the recognition image; and designating means for designating one or more OCR engines by combining the recognition image and the one or more OCR engines, wherein the character recognition process is implemented by using the one or more OCR engines designated by the designating means, the designating means designates the one or more OCR engines corresponding to a process being an object of the recognition image, and a plurality of the one or more OCR engines corresponding to the processes being the objects of the recognition image are designated and the processes are concurrently implemented, wherein upon receipt of a facsimile during the character recognition process of a received document by an OCR engine for English, the OCR implementing device is configured to implement the character recognition process for the facsimile using a different OCR engine, the character recognition process for the facsimile performed concurrently with the character recognition process for the received document.

6. The document OCR implementing device as claimed in claim 5, wherein one or more proper OCR engines for processing the object of recognition, adjusted to the work of the user or every user registered, are individually set.

7. A document OCR implementing device, comprising:

reading means for reading a document and forming a recognition image;

obtaining means for performing image processing of the recognition image and obtaining a state of the recognition means;

a plurality of OCR engines configured to perform a character recognition process of the recognition image; and designating means for designating one or more OCR engines by combining the recognition image and the one or more OCR engines, wherein the character recognition process is implemented by using the one or more OCR engines designated by the designating means, the designating means designates the one or more OCR engines corresponding to the state of the recognition image obtained by the obtaining means, the designating means designates the one or more OCR engines corresponding to a process being an object of the recognition image, and a plurality of the one or more OCR engines corresponding to the processes being the objects of the recognition image are designated and the processes are concurrently implemented, wherein upon receipt of a facsimile during the character recognition process of a received document by an OCR engine for English, the OCR implementing device is configured to implement the character recognition process for the facsimile using a different OCR engine, the character recognition process for the facsimile performed concurrently with the character recognition process for the received document.

8. The document OCR implementing device as claimed in claim 7, wherein one or more proper OCR engines for processing the object of recognition, adjusted to the work of the user or every user registered, are individually set.

9. A document OCR implementing method, comprising:

reading a document and forming a recognition image;

performing image processing of the recognition image and obtaining a state of the recognition image; and designating one or more OCR engines configured to perform a character recognition process of the recognition image, by combining the recognition image and the one or more OCR engines, wherein the character recognition process is implemented by using the one or more designated OCR engines, the one or more OCR engines are designated corresponding to a process being an object of the recognition image, and a plurality of the one or more OCR engines corresponding to the processes being the objects of the recognition image are designated and the processes are concurrently implemented, wherein upon receipt of a facsimile during the character recognition process of a received document by an OCR engine for English, the character recognition process is implemented for the facsimile using a different OCR engine, the character recognition process for the facsimile performed concurrently with the character recognition process for the received document.

10. The document OCR implementing method as claimed in claim 9, wherein one or more proper OCR engines for processing the object of recognition, adjusted to the work of the user or every user registered, are individually set.

11. A document OCR implementing method, comprising:

reading a document and forming a recognition image;

performing image processing of the recognition image and obtaining a state of the recognition image; and designating one or more OCR engines configured to perform a character recognition process of the recognition image, by combining the recognition image and the one or more OCR engines;

wherein the character recognition process is implemented by using the one or more OCR engines, the one or more OCR engines corresponding to the state of the recognition image are designated, the one or more OCR engines are designated corresponding to a process being an object of the recognition image, and a plurality of the one or more OCR engines corresponding to the processes being the objects of the recognition image are designated and the processes are concurrently implemented, wherein upon receipt of a facsimile during the character recognition process of a received document by an OCR engine for English, the character recognition process is implemented for the facsimile using a different OCR engine, the character recognition process for the facsimile performed concurrently with the character recognition process for the received document.

12. The document OCR implementing method as claimed in claim 11, wherein one or more proper OCR engines for processing the object of recognition, adjusted to the work of the user or every user registered, are individually set.

* * * * *

UNITED STATES PATENT AND TRADEMARK OFFICE
CERTIFICATE OF CORRECTION

| | |
|---|---|
| PATENT NO. | : 7,769,249 B2 |
| APPLICATION NO. | : 11/509747 |
| DATED | : August 3, 2010 |
| INVENTOR(S) | : Kiyoshi Kasatani |

It is certified that error appears in the above-identified patent and that said Letters Patent is hereby corrected as shown below:

Title Page, Item (73) Assignee should read: Ricoh Company, LTD., Tokyo (JP)

Signed and Sealed this

Seventh Day of December, 2010

David J. Kappos
*Director of the United States Patent and Trademark Office*